United States Patent [19]
Rao et al.

[11] Patent Number: 5,768,272
[45] Date of Patent: Jun. 16, 1998

[54] NT2 UNIT FOR AN ATM NETWORK

[75] Inventors: Sathyanarayana Rao; Martin Potts, both of Bern, Switzerland

[73] Assignee: Ascom Tech AG, Bern, Switzerland

[21] Appl. No.: 617,744

[22] PCT Filed: Aug. 22, 1995

[86] PCT No.: PCT/IB95/00674

§ 371 Date: May 1, 1996

§ 102(e) Date: May 1, 1996

[87] PCT Pub. No.: WO96/07290

PCT Pub. Date: Mar. 7, 1996

[30] Foreign Application Priority Data

Sep. 1, 1994 [CH] Switzerland ............ 02 677/94

[51] Int. Cl.$^6$ ........................................ H04L 12/56
[52] U.S. Cl. ........................................ 370/395; 370/351
[58] Field of Search ........................... 370/395, 392, 370/364, 524, 396, 397, 400, 409, 463, 351

[56] References Cited

U.S. PATENT DOCUMENTS

| | | |
|---|---|---|
| 5,490,138 | 2/1996 | Niestegge et al. |
| 5,546,386 | 8/1996 | Gass ........................... 370/395 |
| 5,602,853 | 2/1997 | Ben-Michael et al. ........... 370/395 |

FOREIGN PATENT DOCUMENTS 0579980   1/1994   European Pat. Off.

OTHER PUBLICATIONS

Takase et al., "ATM Transport Node for Flexible and Robust Access Networks" *IEEE Global Telecommunications Conference In Houston—Globecom '93 Technical Program Conference Record*, vol. 3 of 4, pp. 1481-1487, 29 Nov. 1993, N.Y., New York, USA.

"SwitchMAN—Switch-based ATM Gigabit MAN and Customer Premises Network" *IBM® Technical Disclosure Bulletin*, vol. 36, No. 11, Nov. 1993, pp. 263-264, Armonk, New York, USA.

"Shared-Medium-Based Subscriber Ring Access to ATM Networks" *IBM® Technical Disclosure Bulletin*, vol. 37, No. 4b, Apr. 1994, pp. 241-244; Armonk, New York, USA.

*Primary Examiner*—Douglas W. Olms
*Assistant Examiner*—Ajit Patel

[57] ABSTRACT

A NT2 (Network Termination type 2) unit comprises a terminal and control unit and an arbitrary number of identical switching units (39) which are interconnected in a loop configuration by means of two connecting lines (123, 124). Similar to an NT1 (Network Termination type 1) unit, each of the switching units (39) comprises two mutually opposed transmitting paths (23, 24) for ATM (Asynchronous Transfer Mode) cells as well as two input/output circuits (22.1, 22.2) to which the connecting lines (123, 124) are connected. The switching unit (39) further comprises a third input/output circuit (22.3) allowing the connection of terminal equipment. Finally, the switch unit (39) is provided with an extractor (31) and an inserter (32) which are inserted in the transmitting paths (23, 24) and are connected to the third input/output circuit (22.3) via connecting lines (35.1, 35.2). According to address indications contained in the cells, the extractor (31) directs incoming cells either to the second or to the third input/output circuit (22.2, 22.3, respectively). The inserter (32) multiplexes incoming cells to the first input/output circuit (22.1). The switching unit (39) thus provides a switching facility operating in one direction which allows a clear arrangement and a flexible and economical production of the NT2 unit.

4 Claims, 4 Drawing Sheets

NT2 UNIT FOR AN ATM NETWORK

BACKGROUND

The present invention refers to an NT2 unit for an ATM network of claim 1.

The designation ATM (asynchronous transfer mode) refers to a wide band communication technology in the range of approximately 10 to 622 Mbit/s. A kind of packet transfer is concerned wherein said packets have a uniform length and comprise an address part (header) as well as an information part (payload). These packets are currently referred to as cells.

Central switching centers for ATM networks are e.g. known from the documents EP-A-299 473 and WO91/13505. These switching centers or nodes direct the cells arriving on various lines to the required outgoing lines under control of the addresses of the cells, and prevent congestions.

Today, extensive norms concerning the structure and the interfaces of ATM networks exist. There is a division into a public domain and a private domain of the ATM network. So-called Network Terminations type 1 (NT1) serve as interface units between these areas, any kind of Terminal Equipment (TE) being connectable to each NT1 on the private side. A Network Termination type 2 (NT2) is defined for the connection of a plurality of terminal equipments of the same user. By this definition, the required basic functions and intersections U, T, and S are essentially determined.

In a general manner, low-priced and universally applicable structural units are desired for the construction of ATM networks. It is therefore an object of the invention to provide an economical NT2 unit for arbitrary applications in the private domain of an ATM network.

SUMMARY

This object is attained by the present invention, which pertains to an NT2 unit (17) for an ATM network (10). The ATM network (10) is divided into a public domain (11) and a private domain (15), wherein two well-defined intersections U, T and NT1 units (19) (Network Termination type 1) form a border between the domains (11, 15). The public domain (11) comprises switching nodes (12) and transmitting paths (13), whereas the private domain (15) comprises different kinds of terminal equipment (16) and NT2 units (17) (Network Termination type 2). Cells comprising a header and a payload are used for transmission of information between the terminal equipment (16). The terminal equipment (16) are connected to the NT1 units (19) or to the NT2 units (17), while the NT1 units (19) are connected to the switching nodes (12). The NT2 units (17) are connected to the NT1 units (19). The NT1 units (19) comprise at least two mutually opposed transmission paths (23, 24) for the cells and comprise two identical input/output circuits (22.1, 22.2) for the connection of the switching nodes (12) and of the terminal equipment (16), respectively.

The NT2 units comprise at least one switching unit (39) and a connecting and control unit (40), these units (39, 40) being interconnected in a loop configuration via two mutually opposed lines (123, 124). Each of the switching units (39) comprise at least two mutually opposed transmission paths (23, 24) common to the NT1 units (19), three identical input/output circuits (22.1, 22.2, 22.3) common to the NT1 units (19), an extractor (31) and an inserter (32). The two transmission paths (23, 24) are connected via a first (22.1) and a second (22.2) of the three input/output circuits to the lines (123, 124) of the loop configuration. The third (22.3) of the three input/output circuits is connected to the terminal equipment (16). The extractor (31) is inserted into a first (23) of the two transmission paths, and is connected to the third input/output circuit (22.3) and is designed for the controlled deviation of cells from the first transmission path (23) to the third input/output circuit (22.3). The inserter (32) is inserted into a second (24) of the two transmission paths, and is connected to the third input circuit (22.3) and is designed for the controlled multiplexing of the cells from the third input/output circuit (22.3) onto the second transmission path (24).

BRIEF DESCRIPTION OF THE DRAWINGS

The invention is explained in more detail by way of an example with reference to four figures.

DETAILED DESCRIPTION

Figure 1:
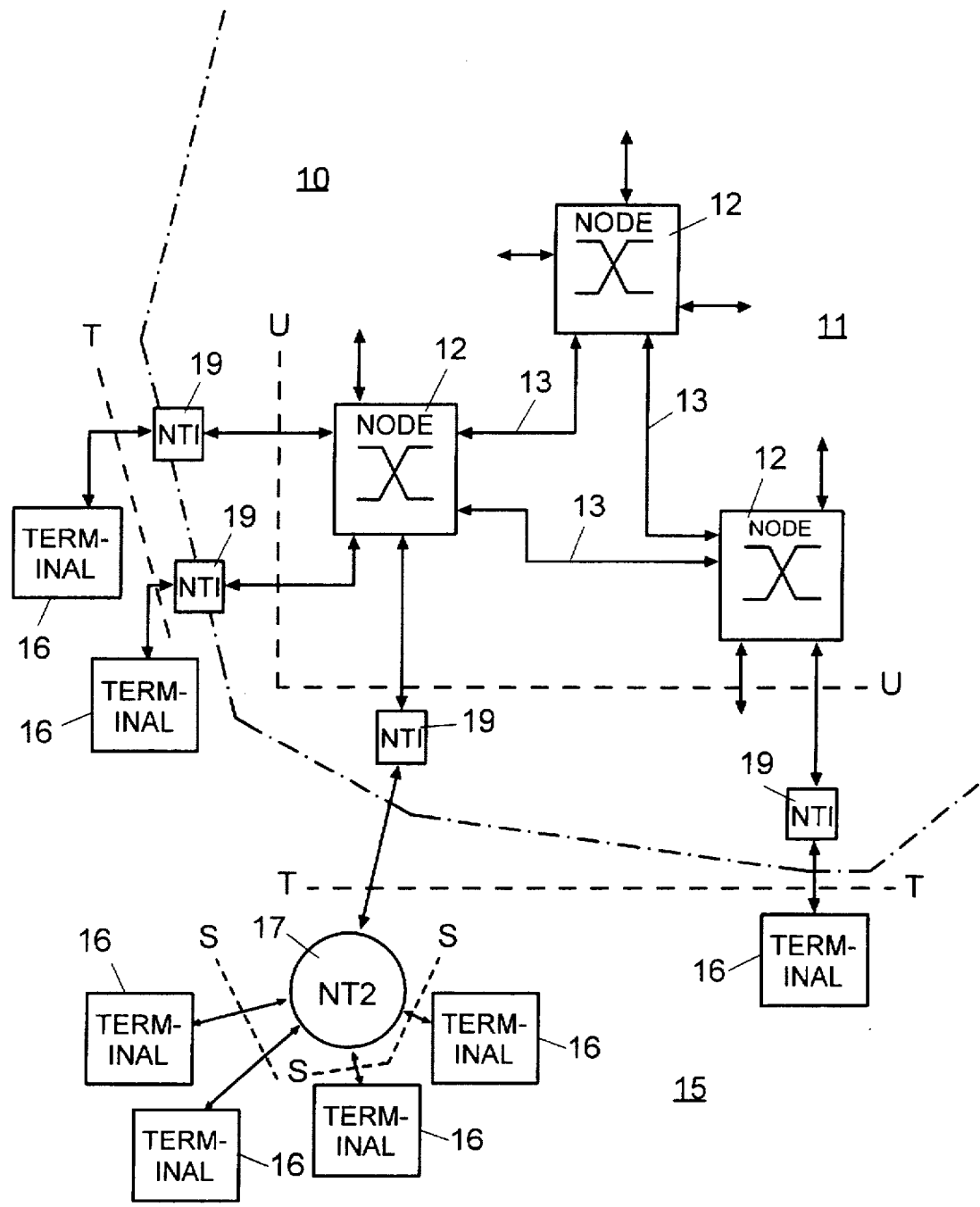
FIG. 1 shows a schematic view of an ATM network (prior art)

FIG. 1 shows a schematic view of an ATM network 10 according to the state of the art. It is divided into a public domain 11 having any number of switching nodes 12 and transmitting lines 13 between said nodes 12, and into a private domain 15 comprising terminals 16 and NT2 (Network Termination type 2) units 17.

At the border of the public domain 11, a plurality of NT1 (Network Termination type 1) units 19 are disposed. Each NT1 unit 19 is connected by its first connection and an intersection U to one of said switching nodes 12. By its second terminal and an intersection T, each NT1 unit 19 is connected to one of terminal equipment 16 or to an NT2 unit 17. In this structure of ATM network 10, NT1 units 19 form a clear boundary between the interests of the public network operator and the interests of the various terminal equipment users, i.e. the network subscribers.

Figure 2:
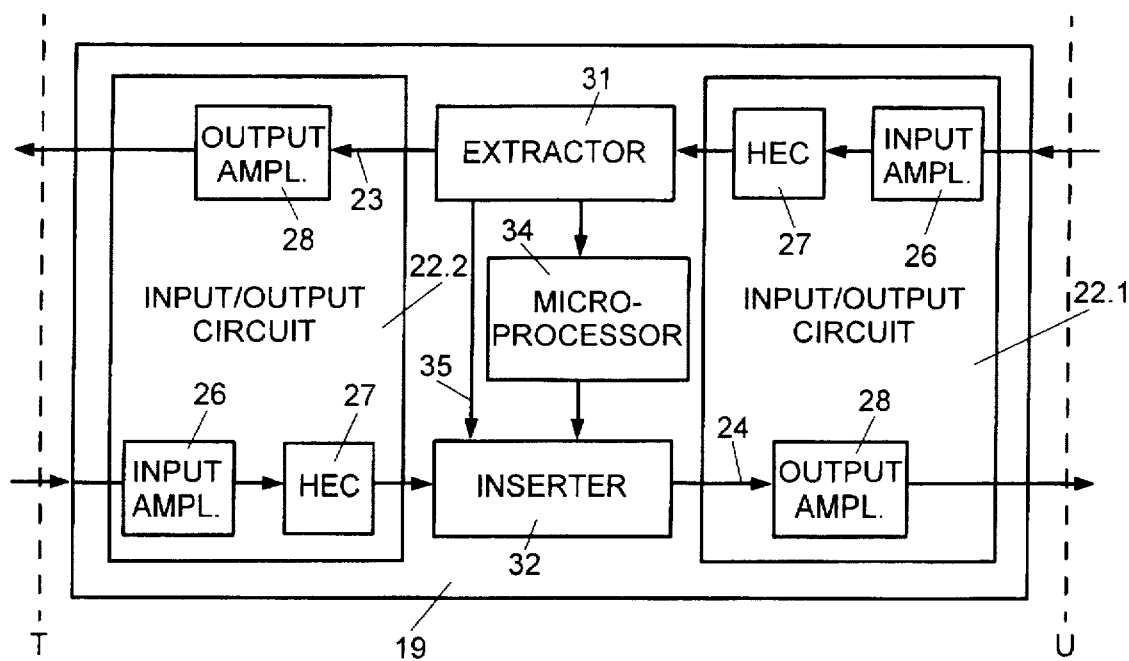
FIG. 2 shows the basic structure of an NT1 unit.

FIG. 2 shows the basic structure of an NT1 unit 19, partly corresponding to the state of the art. This NT1 unit 19 comprises two equal input/output circuits 22.1, 22.2 via which it is connected to two transmission paths 23, 24 working in opposite directions. Externally, said input/output circuits 22 fulfill the conditions of said intersections U and T. In the incoming direction, each of the circuits (22.1, 22.2) comprises an input amplifier 26 and a following Header Error Control HEC 29, and in the outgoing direction, an output amplifier 28. In said input amplifier 26 and in said output amplifier 28, a serial-parallel conversion and a parallel-serial conversion respectively takes place, inter alia. This is necessary because of the high bit speed of the cells. In FIG. 2, the parallel treatment inside NT1 unit 19 is indicated by bold connecting arrows.

Header error control 27 verifies the correctness of the header of each incoming cell. In the case of a minimal error, it attempts to correct the error. If this is not possible or if the error is too large, header error control 27 deletes the entire concerned cell. If the header is correct or if a small error has been corrected, the respective cell is forwarded without any substantial delay in the same direction.

It is now advantageous to implement further functions in said NT1 unit 19 in addition to the normal regenerating and verifying functions which are provided by the two input/output circuits 22.1, 22.2. An extractor 31 in path 23 and an inserter 32 in path 24 serve this purpose. Furthermore, a microprocessor 34 and a feedback line 35 between extractor 31 and inserter 32 serve said purpose.

The additional functions provided by said units 31, 32, 34, 35 are the following: extractor 31 is capable of receiving instructions and requests from the public network domain 11 from passing cells and of supplying them to microprocessor 34. Conversely, the microprocessor 34 can transmit error messages and/or answers via inserter 32 and passing cells to the public network domain 11. Further, on order of a cell, this entire cell may be deviated from path 23 to path 24 for checking purposes. This is equivalent to the looping back of this cell coming from the public domain 11 to said public domain.

By means of the mentioned functions, i.e. (check header of each incoming cell, receive and retransmit each cell having a correct header and delete each cell having an incorrect header, and loop back cells with specially labelled header arriving from public domain 11), each connection to the private domain 15 can be checked for operativeness from the public domain 11. In the case of a malfunction, it is possible to decide at a central location whether the error source is to be found in the public domain 11 including the concerned NT1 unit 19, or in the private domain 15. This facilitates the operation of network 10 considerably.

Figure 3:
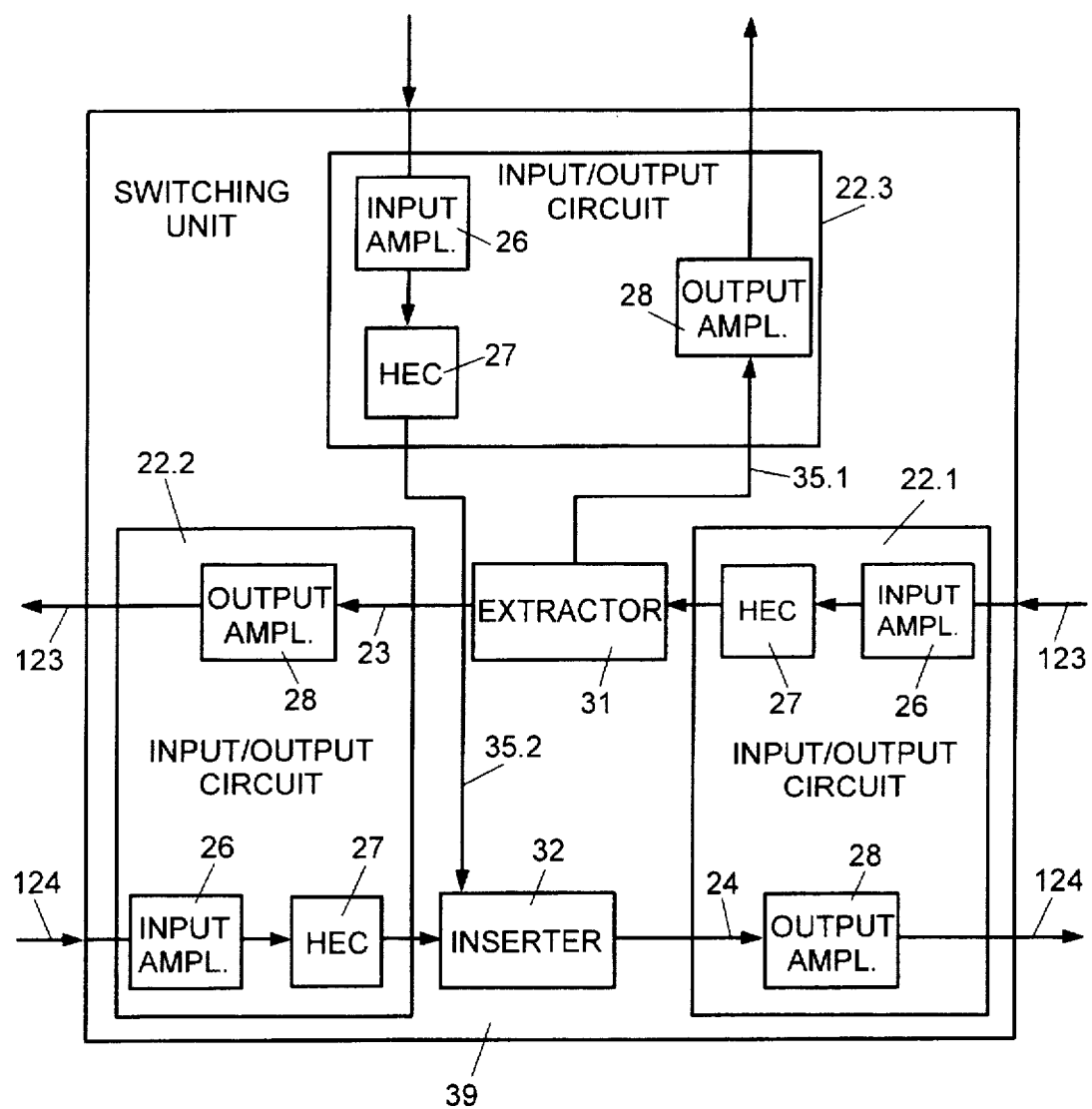
FIG. 3 shows a modified NT1 unit.

FIG. 3 shows the structure of a switching unit 39. The construction of this unit 39 is substantially the same as that of the described NT1 unit 19. The main difference consists in the fact that feedback line 35 is divided into two lines 35.1, 35.2 which are connected to an additional input/output circuit 22.3. Switching unit 39 thus comprises three input/output circuits 22.1, 22.2, 22.3 of identical design. An associated difference is that the loopback function of NT1 unit 19 is transformed into a deviating function. This modification only requires a small intervention in extractor 31.

In this manner, switching unit 39 is suitable for the transmission or the controlled deviation of complete cells, a possible deviating order being comprised in the header of the cell to be deviated. This means that switching unit 39 comprises a switching function on account of which cells arriving on path 23 are either forwarded to input/output circuit 22.2 or to input/output circuit 22.3. On the other hand, both the cells arriving on input/output circuit 22.2 and those arriving on input/output circuit 22.3 are directed to input/output circuit 22.1, inserter 32 performing the necessary multiplexing of the cells.

Figure 4:
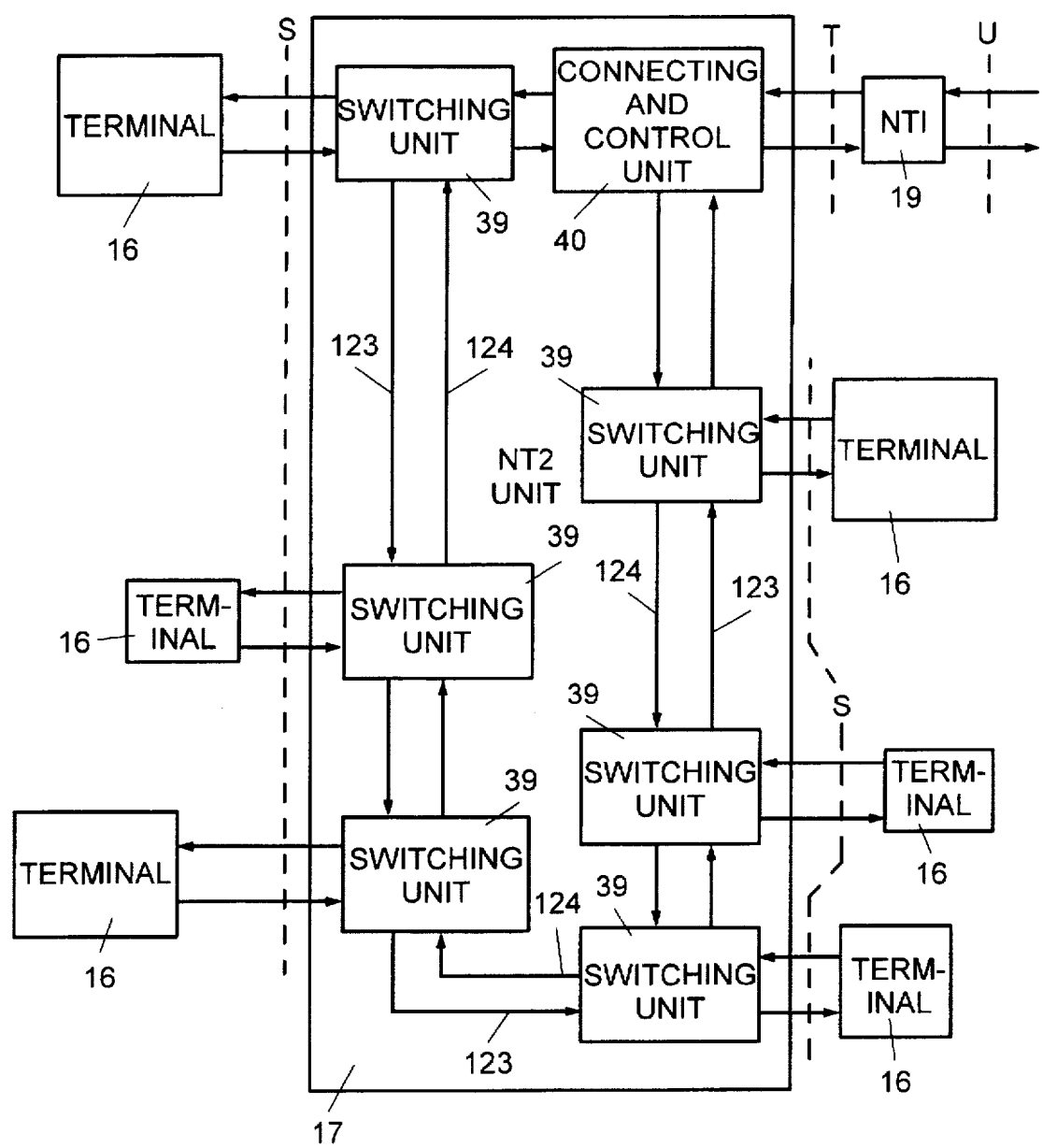
FIG. 4 shows the structure of an NT2 unit.

FIG. 4 shows the structure of an NT2 unit 17. Unit 17 comprises any number of switching units 39, e.g. six. Said switching units 39 are connected in a loop configuration by parallel lines 123, 124 corresponding to the mentioned transmitting paths 23, 24. For the connection to the public domain 11, a connecting and control unit 40 is provided which is connected to said domain 11 by an intersection T and an NT1 unit 19, as described. Terminal equipment 16 of any kind is connected or connectable to each one of switching units 39.

The loop structure of NT2 unit 17 provides substantial advantages. The greatest advantage consists in the fact that the terminals for terminal equipments 16, i.e. switching units 39, are already existing units essentially, namely NT1 units 19. As described, these units only require small additions and modifications in order to be transformed into switching units 39. The production costs of the switching units 39 is thereby drastically reduced since, on one hand, the costs for development are largely avoided, and on the other hand, the manufacturing costs are strongly reduced due to large-scale manufacture. Besides these very decisive economical advantages, however, the described NT2 unit 17 also offers purely technical advantages since it has a simple and clear concept which provides constructional, and subsequently, operational flexibility. For example, this flexibility may be due to the fact that the involved switching units 39 may be placed at large distances from each other, the length of lines 123, 124 being almost unlimited. Furthermore, the subsequent addition or the removal of a switching unit 39 from the loop of the NT2 unit is easy.

What is claimed is:

1. An NT2 unit (17) for an ATM network (10) wherein:

said ATM network (10) is divided into a public domain (11) and a private domain (15), wherein two well-defined intersections U, T and NT1 units (19) (Network Termination type 1) form a border between said domains (11, 15);

wherein said public domain (11) comprises switching nodes (12) and transmitting paths (13);

wherein said private domain (15) comprises different kinds of terminal equipment (16) and NT2 units (17) (Network Termination type 2);

wherein cells comprising a header and a payload are used for transmission of information between said terminal equipment (16);

wherein said terminal equipment (16) are connected to said NT1 units (19) or to said NT2 units (17);

wherein said NT1 units (19) are connected to said switching nodes (12);

wherein said NT2 units (17) are connected to said NT1 units (19);

wherein said NT1 units (19) comprise at least two mutually opposed transmission paths (23, 24) for said cells and comprise two identical input/output circuits (22.1, 22.2) for the connection of said switching nodes (12) and of said terminal equipment (16), respectively;

wherein said NT2 unit comprises at least one switching unit (39) and a connecting and control unit (40), these units (39, 40) being interconnected in a loop configuration via two mutually opposed lines (123, 124);

wherein said at least one switching unit (39) comprises at least two mutually opposed transmission paths (23, 24) common to said NT1 units (19), three identical input/output circuits (22.1, 22.2, 22.3) common to said NT1 units (19), an extractor (31) and an inserter (32);

wherein said two transmission paths (23, 24) are connected via a first (22.1) and a second (22.2) of said three input/output circuits to said lines (123, 124) of said loop configuration;

wherein a third (22.3) of said three input/output circuits is connected to said terminal equipment (16);

wherein said extractor (31) is inserted into a first (23) of said two transmission paths, and is connected to said third input/output circuit (22.3) and is designed for the controlled re-direction of complete said cells from said first transmission path (23) to said third input/output circuit (22.3); and wherein said inserter (32) is inserted into a second (24) of said two transmission paths, and is connected to said third input circuit (22.3) and is designed for the controlled multiplexing of complete said cells from said third input/output circuit (22.3) onto said second transmission path (24).

2. An NT2 unit for an ATM network, wherein i) said ATM network is divided into a public domain and a private domain, wherein two well-defined intersections U, T and NT1 units (Network Termination type 1) form a border between said domains; ii) wherein said public domain comprises switching nodes and transmitting paths; iii) wherein said private domain comprises different kinds of terminal equipment and NT2 units (Network Termination type 2); iv) wherein cells comprising a header and a payload are used for transmission of information between said terminal equipment; v) wherein said terminal equipment are connected to said NT1 units or to said NT2 units; vi) wherein said NT1 units are connected to said switching nodes; vii) wherein said NT2 units are connected to said NT1 units; and viii) wherein said NT1 units comprise at least two mutually opposed transmission paths for said cells and comprise two identical input/output circuits for the connection of said switching nodes and of said terminal equipment, respectively, wherein said NT2 unit comprises:

at least one switching unit and a connecting and control unit, these units being interconnected in a loop configuration via two mutually opposed lines;

wherein said at least one switching unit comprises at least two mutually opposed transmission paths common to said NT1 units, three identical input/output circuits common to said NT1 units, an extractor and an inserter;

wherein said two transmission paths are connected via a first and a second of said three input/output circuits to said lines of said loop configuration;

wherein a third of said three input/output circuits is connected to said terminal equipment;

wherein said extractor is inserted into a first of said two transmission paths, and is connected to said third input/output circuit and is designed for the controlled re-direction of complete said cells from said first transmission path to said third input/output circuit; and wherein said inserter is inserted into a second of said two transmission paths, and is connected to said third input circuit and is designed for the controlled multiplexing of complete said cells from said third input/output circuit onto said second transmission path.

3. An NT2 (Network Termination type 2) unit for an ATM network, wherein said NT2 unit connects an NT1 unit (Network Termination type 1) with at least one terminal, said NT2 unit comprising:

at least one switching unit and a connecting and control unit interconnected in a loop configuration via two mutually opposed lines;

wherein said at least one switching unit comprises at least two mutually opposed transmission paths, three identical input/output circuits, an extractor and an inserter;

wherein said two transmission paths are connected via a first and a second of said three input/output circuits to said lines of said loop configuration;

wherein a third of said three input/output circuits is connected to one of said terminals;

wherein said extractor is inserted into a first of said two transmission paths, and is connected to said third input/output circuit and is designed for the controlled re-direction of cells from said first transmission path to said third input/output circuit; and wherein said inserter is inserted into a second of said two transmission paths, and is connected to said third input circuit and is designed for the controlled multiplexing of said cells from said third input/output circuit onto said second transmission path.

4. A switching unit for a NT2 (Network Termination type 2) unit for use in an ATM network, wherein said NT2 unit connects a NT1 unit (Network Termination type 1) with at least one terminal, and wherein said switching unit and a connecting and control unit are interconnected in a loop configuration of said NT2 unit via two mutually opposed lines, said switching unit comprising:

at least two mutually opposed transmission paths, three identical input/output circuits, an extractor and an inserter;

wherein said two transmission paths are connected via a first and a second of said three input/output circuits to said lines of said loop configuration;

wherein a third of said three input/output circuits is connected to said terminal;

wherein said extractor is inserted into a first of said two transmission paths, and is connected to said third input/output circuit and is designed for the controlled deviation of cells from said first transmission path to said third input/output circuit; and wherein said inserter is inserted into a second of said two transmission paths, and is connected to said third input circuit and is designed for the controlled multiplexing of said cells from said third input/output circuit onto said second transmission path.

* * * * *